Figure 4:
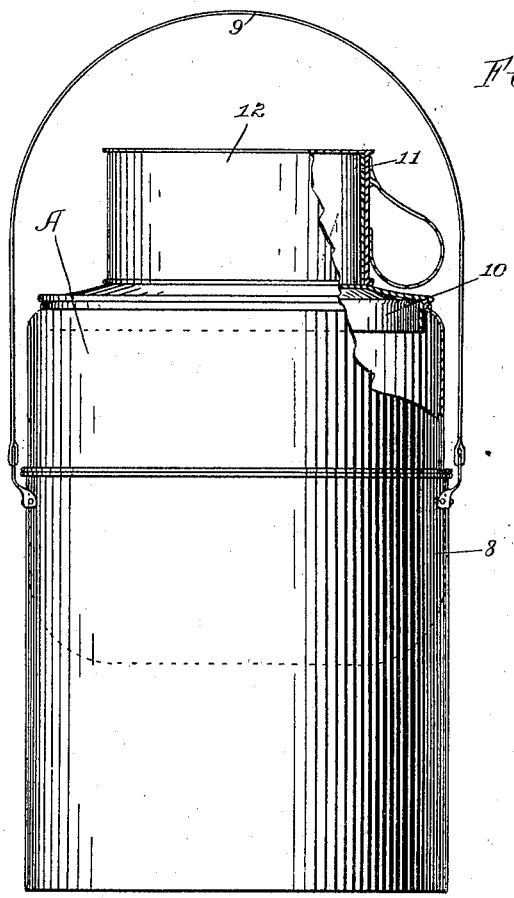

(No Model.) 2 Sheets—Sheet 1.
J. DANZ, 2d.
REVERSIBLE COMPARTMENT LID FOR DINNER PAILS.
No. 585,259. Patented June 29, 1897.
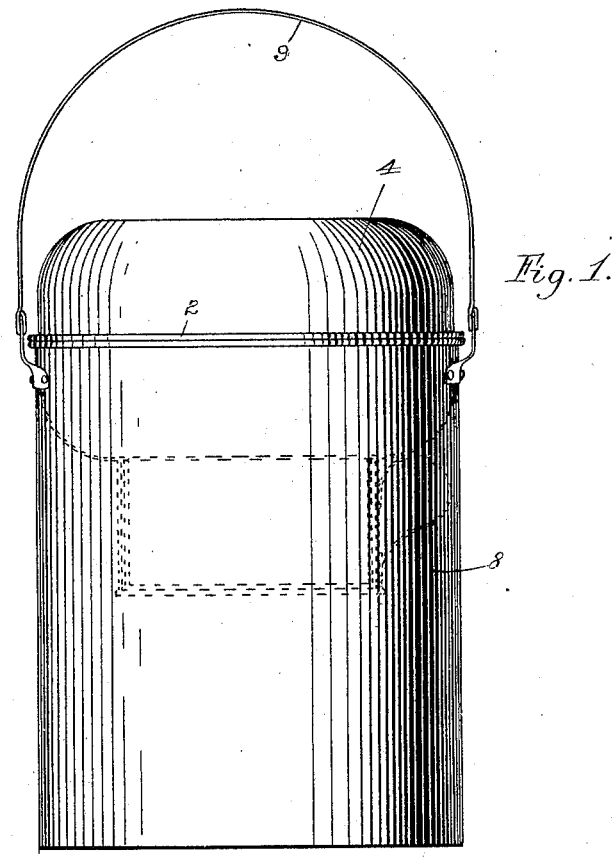
Fig. 1.
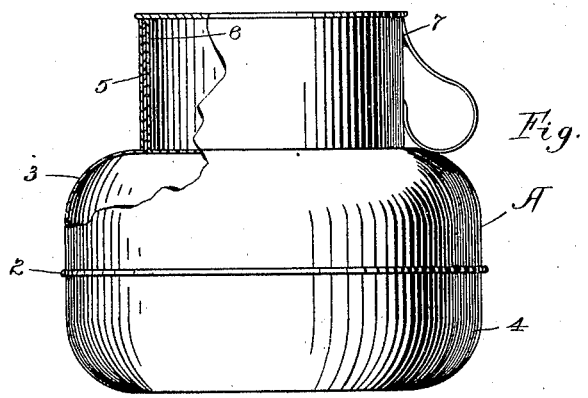
Fig. 2.
Fig. 3.
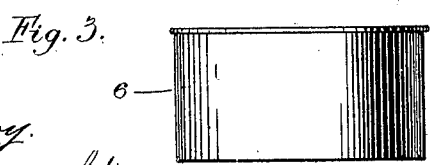
Witnesses:
F. L. Bradbury.
Minnie L. Thauwald.
Inventor:
Jacob Danz 2nd.
per: V. D. Merwin
Attorney.
THE NORRIS PETERS CO., PHOTO-LITHO., WASHINGTON, D. C.

(No Model.) 2 Sheets—Sheet 2.
J. DANZ, 2d.
REVERSIBLE COMPARTMENT LID FOR DINNER PAILS.
No. 585,259. Patented June 29, 1897.

Witnesses:
F. M. Bradbury.
Minnie L. Thauwald.

Inventor:
Jacob Danz 2nd.
per: V. A. Merwin
Attorney.

UNITED STATES PATENT OFFICE.

JACOB DANZ, 2D, OF ST. PAUL, MINNESOTA.

REVERSIBLE COMPARTMENT-LID FOR DINNER-PAILS.

SPECIFICATION forming part of Letters Patent No. 585,259, dated June 29, 1897.

Application filed July 25, 1895. Serial No. 557,103. (No model.)

*To all whom it may concern:*

Be it known that I, JACOB DANZ, 2d, of St. Paul, Ramsey county, Minnesota, have invented certain Improvements in Reversible Compartment-Lids for Dinner-Pails, of which the following is a specification.

My invention relates to improvements in dinner-pails, its object being to provide a reversible lid therefor which will also serve as a liquid-receptacle.

To this end my invention consists in providing a hollow lid the side walls of the body of which are parallel with and conform, circumferentially, to the side walls of the pail-body, so as to fit tightly within the same. The lid is provided with a circumferential medial rib, which serves as a stop to limit the inward movement of the lid by resting upon the top of the pail with the lid in either normal or reversed position. The top of the lid is formed with a relatively large opening, having a neck to receive a tightly-fitting tray and to be covered by a similarly-fitting cup, while the bottom of the lid is closed, both bottom and top being symmetrically formed and of like dimensions.

My invention further consists in the construction and combination hereinafter particularly described and claimed.

In the accompanying drawings, forming part of this specification, Figure 1 is a side elevation of a pail, showing the lid fitted thereto in inverted position. Fig. 2 is a similar view of the lid, partially broken away to better show the construction. Fig. 3 is a detail of the tray, which is fitted into the flanged opening in the top thereof; and Fig. 4 is a modified form of my invention of more ample proportions and having a relatively larger top opening.

In the drawings, A represents my improved receptacle-lid, shown, preferably, of cylindrical form, with similar convexed top and bottom portions 3 and 4, and provided with a medial circumferential rib 2. The lid is provided with an opening in its top, having a flange 5, into which is fitted the tray 6, which serves as a receptacle for articles of food and tightly closes the receptacle, the flange and tray being covered by the drinking-cup 7, snugly fitted upon the flange, as shown in Fig. 2.

When the pail and lid are supplied with articles of food and drink, the normal position of the lid is with the top or part 3 upward, in the position shown in Fig. 2; but when the contents have been removed from both the lid is reversed in position, as shown in Fig. 1, thus leaving a space between it and the bail 9 to permit the insertion of the arm of the carrier. The exterior diameter of the lid is equal to the interior diameter of the pail 8, and therefore fits snugly therein in either normal or reversed position.

Fig. 4 shows a modified construction in which the lid A, while similar in form to that shown in Figs. 1 and 2, is provided with a relatively larger opening in its top, into which fits the cover 10, having a neck 11, which serves as a tray, over which is fitted the cup 12, the lid fitting into the pail in normal or inverted position in the same manner as the form shown in the other figures.

I claim—

In combination with a pail, the hollow compartment-lid therefor, such lid having thereon means for holding a cup, and a circumferential rib adapted to rest upon the top of the pail-body, the walls of the lid on each side of the rib being parallel with and adapted to closely fit in said body.

In testimony whereof I affix my signature in presence of two witnesses.

JACOB DANZ, 2D.

Witnesses:
H. S. JOHNSON,
MINNIE L. THAUWALD.